United States Patent
Balachandran et al.

(10) Patent No.: US 6,366,624 B1
(45) Date of Patent: Apr. 2, 2002

(54) SYSTEMS AND METHODS FOR RECEIVING A MODULATED SIGNAL CONTAINING ENCODED AND UNENCODED BITS USING MULTI-PASS DEMODULATION

(75) Inventors: Kumar Balachandran, Cary; Ali Khayrallah, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/201,651

(22) Filed: Nov. 30, 1998

(51) Int. Cl.⁷ ............... H03M 13/41; H03M 13/03; H03M 13/37; H03M 13/39

(52) U.S. Cl. ............ 375/341; 375/262; 375/265; 375/267; 375/342; 714/792; 714/794; 714/795; 714/798

(58) Field of Search ................. 375/262, 265, 375/267, 340, 341, 342, 259, 316; 714/758, 786, 791, 792, 794, 795, 798

(56) References Cited

U.S. PATENT DOCUMENTS

| | | | |
|---|---|---|---|
| 5,502,713 A | * 3/1996 | Lagerqvist et al. | 370/17 |
| 5,666,370 A | * 9/1997 | Ganesan et al. | 371/37.01 |
| 5,673,291 A | 9/1997 | Dent | |
| 5,790,596 A | * 8/1998 | Sexton | 375/228 |
| 5,901,186 A | * 5/1999 | Jamal et al. | 375/346 |
| 6,084,926 A | * 7/2000 | Zak et al. | 375/341 |
| 6,263,029 B1 | * 7/2001 | Alard et al. | 375/340 |

FOREIGN PATENT DOCUMENTS

| | | |
|---|---|---|
| DE | 195 47 018 | 12/1995 |
| FR | 0802 656 A | 10/1997 |
| WO | WO 98 48517 | 10/1998 |

OTHER PUBLICATIONS

Deutgen et al., *Forward–Error–Control–Assisted Detection*, Lulea University of Technology, 1994.

Garr, et al., *Iterative Decoding of GSM Signals*, Conference on Information Sciences and Systems, Princeton University, Mar. 1988.

Berrou et al., *Near Shannon Limit Error–Correcting Coding and Decoding: Turbo Codes* (1), Proceedings of the IEEE International Communication Conference, 1993, pp. 1064–1070.

Bahl, et al., *Optimal Decoding of Linear Codes for Minimizing Symbol Error Rate*, IEEE Transactions on Information Theory, Mar. 1974, pp. 284–287.

Berrou et al., *A Low Complexity Soft–Output Viterbi Decoder*, Integrated Circuits for Telecommunications Laboratory, 1994.

(List continued on next page.)

*Primary Examiner*—Chi Pham
*Assistant Examiner*—Khanh Tran
(74) *Attorney, Agent, or Firm*—Myers Bigel Sibley & Sajovec

(57) ABSTRACT

Methods and systems are provided for receiving a modulated signal including symbols representing both encoded and unencoded bits from a data (e.g., speech) frame where a received slot is first demodulated and the encoded bits are decoded. The decoded bits are then utilized to constrain demodulation during a second demodulation of a received slot. The encoded bit positions from the constrained second demodulation are, in turn, encoded to generate bit estimates for the received slot. This information is combined with the output of the constrained second demodulation for unencoded bits to provide a received data frame estimate which has been shown to have improved reliability for both encoded and unencoded bits. The methods and systems further provide for recursively repeating the demodulation and decoding steps until a counter expires or a desired reliability is obtained.

30 Claims, 5 Drawing Sheets

OTHER PUBLICATIONS

Robertson, et al., *A Comparison of Optimal and Sub–Optimal MAP Decoding Algorithms Operating in the Log Domain*, Institute for Communications Technology, 1995, pp. 1009–1013.

Benedetto et al., *Serial Concatenation of Interleaved Codes: Performance Analysis, Design and Iterative Decoding*, TDA Progress Report, 42–126, Politechnico Di Torino, Italy, Aug. 15, 1996.

Hagemauer, et al., *A Viterbi Algorithm with Soft–Decision Outputs and its Applications*, German Aerospace Research Establishment, 1989, pp. 1680–1686.

Narayanak K R et al., *A Novel ARQ Technique Using the Turbo Coding Principle*, IEEE Communications Letters, vol. 1, No. 2, Mar. 1997.

Douillard C. et al., *Iterative Correction of Intersymbol Interference: Turbo–Equalization*, European Transactions on Telecommunications and Related Technologies, vol. 6, No. 5, Sep. 1, 1995.

Copy of PCT Search Report for PCT/US99/24170.

Copy of PCT Written Opinion for PCT/US99/24170.

English Abstract of DE 19547018 from esp@cenet.

English Translation of DE 19547018 without claims.

* cited by examiner

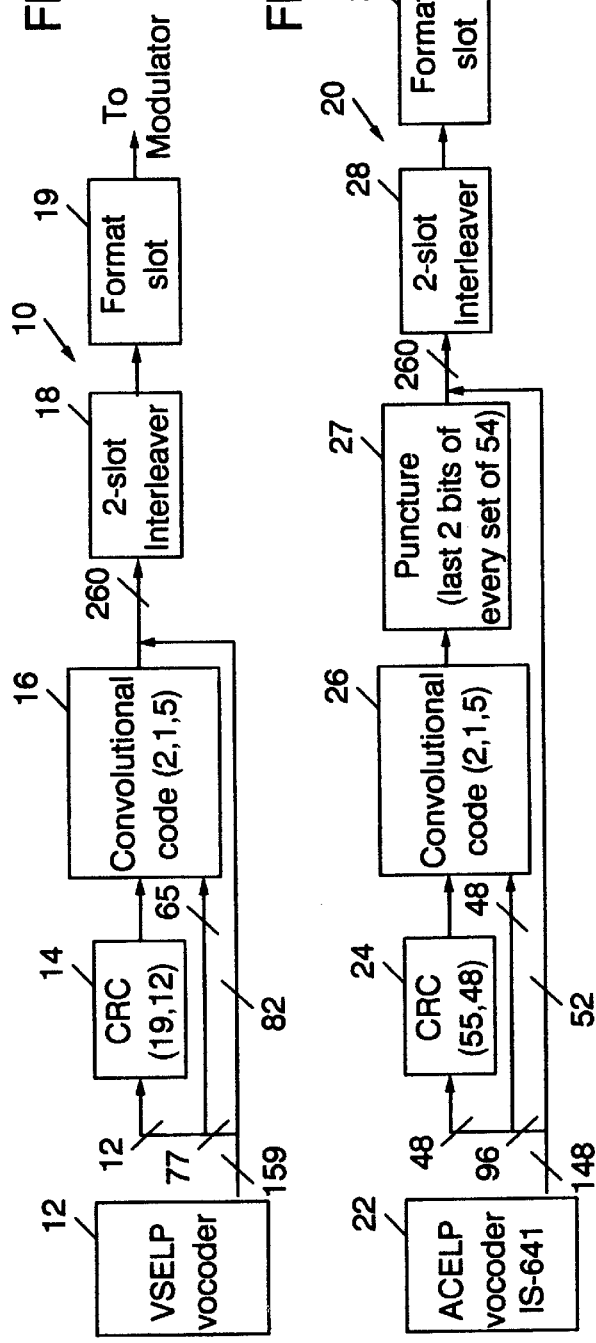

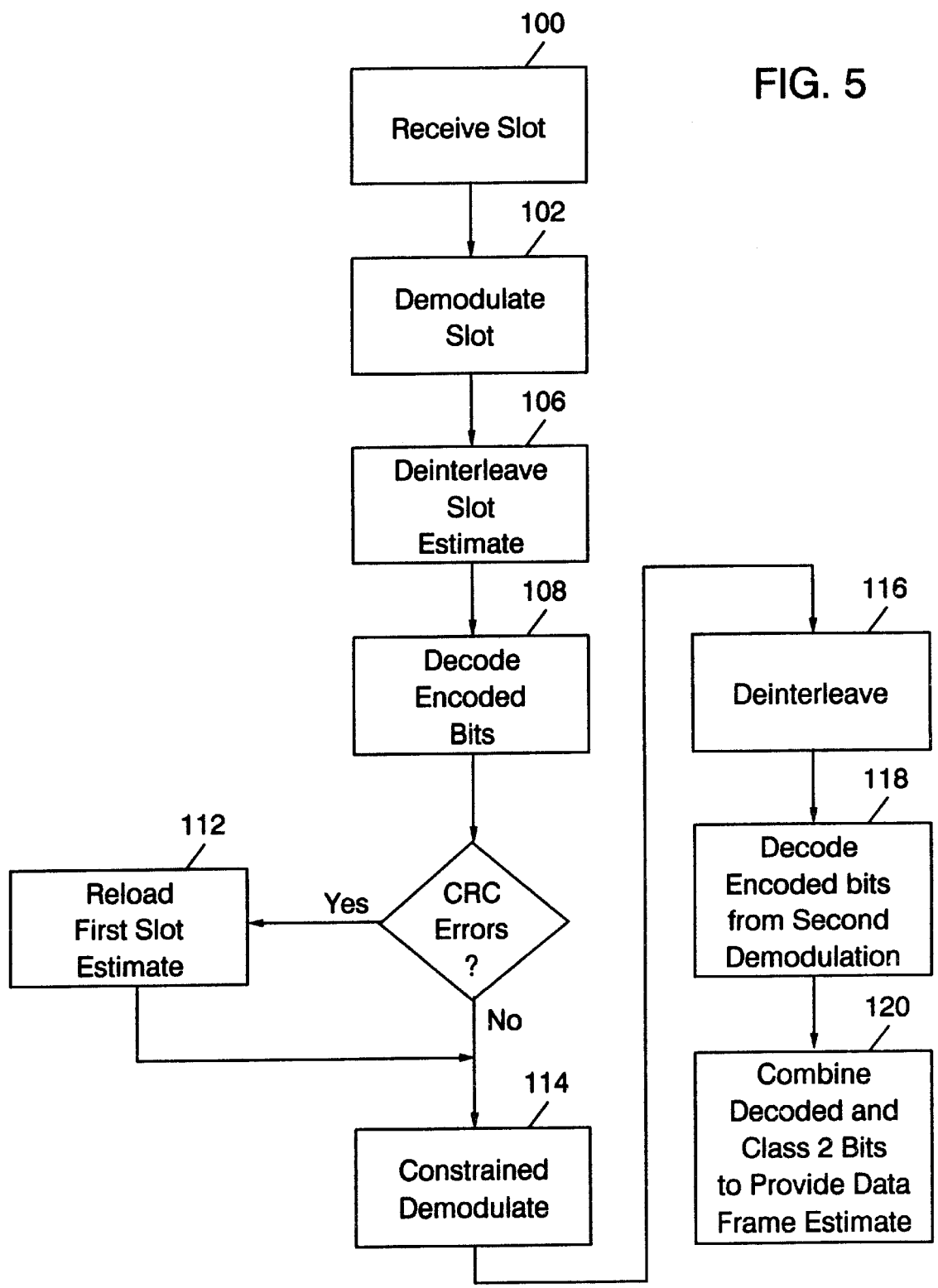

SYSTEMS AND METHODS FOR RECEIVING A MODULATED SIGNAL CONTAINING ENCODED AND UNENCODED BITS USING MULTI-PASS DEMODULATION

FIELD OF THE INVENTION

This invention relates to communication systems and more particularly to systems and methods for receiving modulated signals.

BACKGROUND OF THE INVENTION

Public wireless radiotelephone systems are commonly employed to provide voice and data communications to subscribers. For example, analog cellular radiotelephone systems, such as designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

Wireless communications systems such as cellular radiotelephone systems typically include a plurality of communication channels which may be established between a first transceiver (such as a base station) and a second transceiver (such as a mobile terminal). The communication channels typically are subject to performance-degrading environmental effects such as multi-path fading and interference (noise). Fading effects include flat fading which may arise from the interaction of a transmitted signal (the main ray) with reflected versions of the transmitted signal that arrive concurrently at a receiver. Time dispersion, another type of fading, may arise from interaction of the main ray with time-delayed reflections of the main ray. Interference effects may be caused by interaction of non-orthogonal signals generated in the signal medium by sources other than the source of the desired transmitted signal. Equalization techniques such as maximum likelihood sequence estimation (MLSE) may be used to compensate for time dispersion. Interference may be reduced by using antenna beam steering to reduce reception of undesired signals.

Fading is typically a major detriment to the performance of demodulators in communication systems. The receiver of a mobile terminal typically includes a demodulator which may be a coherent demodulator such as a maximum likelihood sequence estimator (MLSE) demodulator (or equalizer). To provide for reliable demodulation of a received signal, an associated channel tracker is typically provided for the demodulator. After acquisition of a communicated signal by the receiver, the channel tracker maintains a channel estimate to provide a coherent reference between the demodulator and the received signal.

Combining demodulation and decoding via feedback from the decoder to the demodulator is a way to improve receiver performance. This may be accomplished by multi-pass demodulation. According to information theory, an optimal receiver jointly performs the operations of demodulation and decoding.

The complexity of such an operation is generally exorbitant especially when interleaving is used in the system. However, it is possible to bridge part of the gap between disjoint and joint demodulation and decoding by the use of feedback from the decoder to the demodulator. This is the idea behind multi-pass demodulation.

An example of such a multi-pass demodulator is described in U.S. Pat. No. 5,673,291 to Dent which is incorporated herein by reference in its entirety. The '291 patent discusses demodulating a received signal first, then decoding coded symbols, then feeding information obtained by re-encoding the decoder output back to the demodulator to re-demodulate the un-coded symbols with improved performance. The re-encoded symbols are exploited as known symbols with improved performance. The re-encoded symbols are exploited as known symbols by the demodulator, in the same way that it exploits sync symbols, which are true known symbols that have been inserted in the data prior to transmission. The methods and systems of the '291 patent generally are based in part on knowledge by the receiver of the order of placement of symbols in the transmitted stream and on the placement of any known sync symbols. In another approach, Garr et al. proposed a multi-pass demodulator for fully encoded bit streams with soft feedback to the demodulator. D. Garr et al., "Iterative Decoding of GSM Signals," Conference on Information Sciences and Systems, Princeton University, March 1988. Yet another proposed approach as described in, for example, Berrou et al., "Near Shannon Limit Error-correcting Coding and Decoding: Turbo-codes (1)," Proceedings of the IEEE International Communication Conference, pages 1064–1070, 1993, proposes the use of turbo codes in which parallel concatenation of two recursive convolutional codes are used. Likewise, serial concatenation of two recursive convolutional codes was proposed in Benedetto et al., "Serial Concatenation of Interleaved Codes: performance Analysis, Design and Iterative Decoding," TDA Progress Report 42–126, Politechnico Di Torino, Italy, Aug. 15, 1996.

A problem is encountered with methods such as that proposed in the '291 patent and for communications systems having unencoded bit classes. Examples of such codes associated with various telecommunication standards currently proposed are shown in FIGS. 1A and 1B. FIG. 1A illustrates a voice coding system such as that described for the IS-136 specification. FIG. 1B shows a similar format for the IS-641 specification. As shown in FIG. 1A coding system 10 includes a Vector-Sum Excited Linear Prediction (VSELP) vocoder outputting 159 bits as a data frame. The bits are designated into 3 coding classes referred to as Class 1A, Class 1B and Class 2. Twelve bits designated as Class 1A are first passed to CRC error detection coder 14 which appends a Cyclical Redundancy Check (CRC) error detection code to the twelve Class 1A bits before passing them to convolutional encoder 16. An additional 65 bits, classified as Class 1B, are passed directly to convolutional encoder 16 without error detection coding. Finally, 82 bits, classified as Class 2 bits, are passed directly to interleaver 18 without error detection or correction encoding. The output of convolutional encoder 16 and the unprotected Class 2 bits are passed to 2-slot interleaver 18.

Interleaver 18 breaks up the original data frame into two frames, each containing half the original information and each of which is placed in one of two adjacent slots (i.e. sequential transmission windows) by slot formatter 19 for transmission by a modulator (not shown).

Referring now to FIG. 1B, the structure of coding under the IS-641 standard will now be described. Adaptive Code Excited Linear Prediction (ACELP) vocoder 22 of coding system 20 provides a data frame of 148 bits. 48 of the bits are classified as Class 1A and pass to CRC error detection coder 24 where an error detection code is appended to the bits. An additional 48 of the bits from the 148 bit data frame are treated as Class 1B bits and provided to convolutional coder 26 without error detection coding. The remaining 52 bits are treated as Class 2 bits and provided directly to interleaver 28 without coding. The Class 1A and 1B bits are passed through convolutional encoder 26 and, in turn, the code is punctured by circuit 27 to provide a total of 260 bits to two-slot interleaver 28 when combined with the 52 Class 2 bits. As described above with respect to FIG. 1A, interleaver 28 and slot formatter 29 implement interleaving by dividing the 148 bits from source 22 into two separate slots which are provided to a modulator for transmission.

While these various approaches provide the potential for improved signal reception, there continues to be a need for improvements in performance of receivers for modulated signals containing encoded and unencoded data. There is further a need for such improvements which may be utilized with existing communication protocol standards.

SUMMARY OF THE INVENTION

It is, therefore, an object of the present invention to resolve the problem of reception errors in wireless communication systems by providing methods and systems for receiving a modulated signal including encoded bits and unencoded bits using multi-pass demodulation.

It is an additional object of the present invention to provide such systems and methods which may be utilized with existing communication protocol standards.

It is a farther object of the present invention to provide such systems and methods which may be beneficially utilized with MLSE type demodulators providing both hard and soft output information.

It is a further object of the present invention to combine the reduced complexity of the M-algorithm in the demodulator with the feedback information of multi-pass demodulation to obtain an efficient high performance receiver.

These and other objects are provided according to the present invention, by providing methods and systems for receiving a modulated signal including symbols representing both encoded and unencoded bits from a data (e.g., speech) frame where a received slot is first demodulated and the encoded bits are decoded. The decoded bits are then utilized to constrain demodulation during a second demodulation of a received slot. The encoded bit positions from the constrained second demodulation are, in turn, encoded to generate bit estimates for the received slot. This information is combined with the output of the constrained second demodulation for unencoded bits to provide a received data frame estimate which has been shown to provide improved reliability for both encoded and unencoded bits.

In particular, a method for receiving a modulated signal including a plurality of sequentially transmitted slots containing symbols representing encoded bits corresponding to a first subset of bits from a data frame and unencoded bits corresponding to a second subset of bits from the data frame is provided. A first slot is received and demodulated to provide a first slot estimate having encoded bit positions and unencoded bit positions. The encoded bit positions of the first slot estimate are decoded to provide first decoded bit estimates. The first slot is then constrained demodulated, preferably convolutionally, to provide a second slot estimate having encoded bit positions and unencoded bit positions with the second slot estimate of encoded bit positions constrained according to the first decoded bit estimates. The encoded bit positions of the second slot estimate are decoded to provide second decoded bit estimates which are combined with the unencoded bit positions of the second slot estimate to provide a received data frame estimate.

In a further embodiment of the methods of the present invention, after decoding to obtain a first slot estimate, any errors are detected in the first decoded bit estimates and the encoded bit positions of the second slot estimate are not used to generate the second decoded bit estimates if an error is detected. Error detection may be provided by including at least one error detection bit, such as CRC bits, in the first decoded bit estimates and detecting an error in the first decoded bit estimates based on the at least one error detection bit.

Constrained demodulation operations according to an embodiment of the present invention may include discarding during demodulation any candidate bit path having a bit estimate in a location corresponding to one of the encoded bit positions of the first slot which differs from an associated one of the first decoded bit estimates. Alternatively, a metric of any candidate bit path having a bit estimate in a location corresponding to one of the encoded bit positions of the first slot which differs from an associated one of the first decoded bit estimates may be biased to disfavor that candidate bit path. Furthermore, the decoder may output an associated soft reliability value for each first decoded bit estimate and the first slot may then be constrained convolutionally demodulated by biasing a metric of any candidate bit path having a bit estimate in a location corresponding to one of the encoded bit positions of the first slot which differs from an associated one of the first decoded bit estimates based on the associated soft reliability value of the associated one of the first decoded bit estimates.

In another embodiment of the present invention, multi-pass demodulation is provided recursively by repeating the constrained demodulating and the decoding the encoded bit positions of the second slot estimate operations using the decoded bit estimates from a most recent decoding step to constrain the constrained demodulating until a recursion counter reaches a limit and combining a final set of decoded bit estimates and the unencoded bit estimates of a final slot estimate to provide the received frame estimate. Alternatively, recursive operations may continue until a reliability criteria is satisfied. The reliability criteria may be a performance.

In a further aspect, the first demodulation operation may be performed using a differential decoder. Alternatively, a differential decoder may be utilized if a reliability criteria is satisfied and a convolutional decoder may be used otherwise. The present invention may also be utilized with per-survivor processing in the constrained demodulating operations. Furthermore, separate buffer memory may be utilized for each pass of demodulation or a single buffer may be used an overwritten in each pass.

The benefits of the present invention in another embodiment may be realized where the transmitted slots contain interleaved data transmission. The first slot may be received before the second slot. The first decoded bit estimates, bits from the unencoded bit positions of the first slot estimate and unknown bits corresponding to the second segment of bits may be combined to provide a regenerated slot and the constrained demodulating operations may be constrained by using the regenerated slot to restrict trellis transitions during demodulation. Alternatively, trellis transitions may be constrained during demodulation by biasing a metric of selected candidate bit paths based on the regenerated slot.

In another embodiment of the present invention the first slot is constrained trellis demodulated using an M-algorithm having a plurality of trellis stages. The number of surviving states for at least one of the plurality of trellis stages may be specified. The number of surviving states for the plurality of trellis stages further may be specified so as to allow only acceptable paths to continue as surviving states.

In a further aspect of the present invention, a method is provided for receiving a modulated signal including a plurality of sequentially transmitted slots. A first slot is received and demodulated to provide a first slot estimate. The first slot estimate is decoded to provide first decoded bit estimates. The first slot is then constrained demodulated to provide a second slot estimate in which a plurality of bit positions in the second slot estimate are constrained to equal associated ones of the first decoded bit estimates. The second slot estimate is decoded to provide a received data frame estimate. The constrained demodulating operations and the decoding the second slot estimate operations are recursively repeated using the data frame estimate to constrain the constrained demodulation step.

In a system aspect of the present invention, a receiver is provided for receiving a modulated signal including a plurality of sequentially transmitted slots containing symbols representing encoded bits corresponding to a first subset of bits from a data frame and unencoded bits corresponding to a second subset of bits from the data frame. The receiver includes a receiver circuit configured to receive the transmitted slots and a first demodulator coupled to the receiver circuit and configured to generate a first slot estimate from a received slot. A first decoder is coupled to the demodulator so at to provide first decoded bit estimates from the first slot estimate and a constraint slot. A constrained demodulator configured to generate a second slot estimate based on the constraint slot is also provided. A second decoder is provided which is coupled to the constrained demodulator so as to provide second decoded bit estimates from the second slot estimate. Means are also included for combining the second decoded bit estimates and unencoded bit positions of the second slot estimate to provide a received data frame estimate.

While the present invention has been described above primarily with reference to method aspects, it is to be understood that the present invention also encompasses systems aspects including systems configured to carry out the methods of the present invention. Accordingly, the present invention provides novel approaches to multi-pass demodulation which provide improved receiver performance.

BRIEF DESCRIPTION OF THE DRAWINGS

FIG. 1A is a block diagram of a voice coding system according to the IS-136 standard;

FIG. 1B is a block diagram of a voice coding system according to the IS-641 standard;

FIG. 2 is a block diagram of a receiver according to an embodiment of the present invention;

FIG. 5 is a flowchart illustrating operations for receiving a modulated signal according to an embodiment of the present invention;

DETAILED DESCRIPTION OF THE INVENTION

Figure 3:
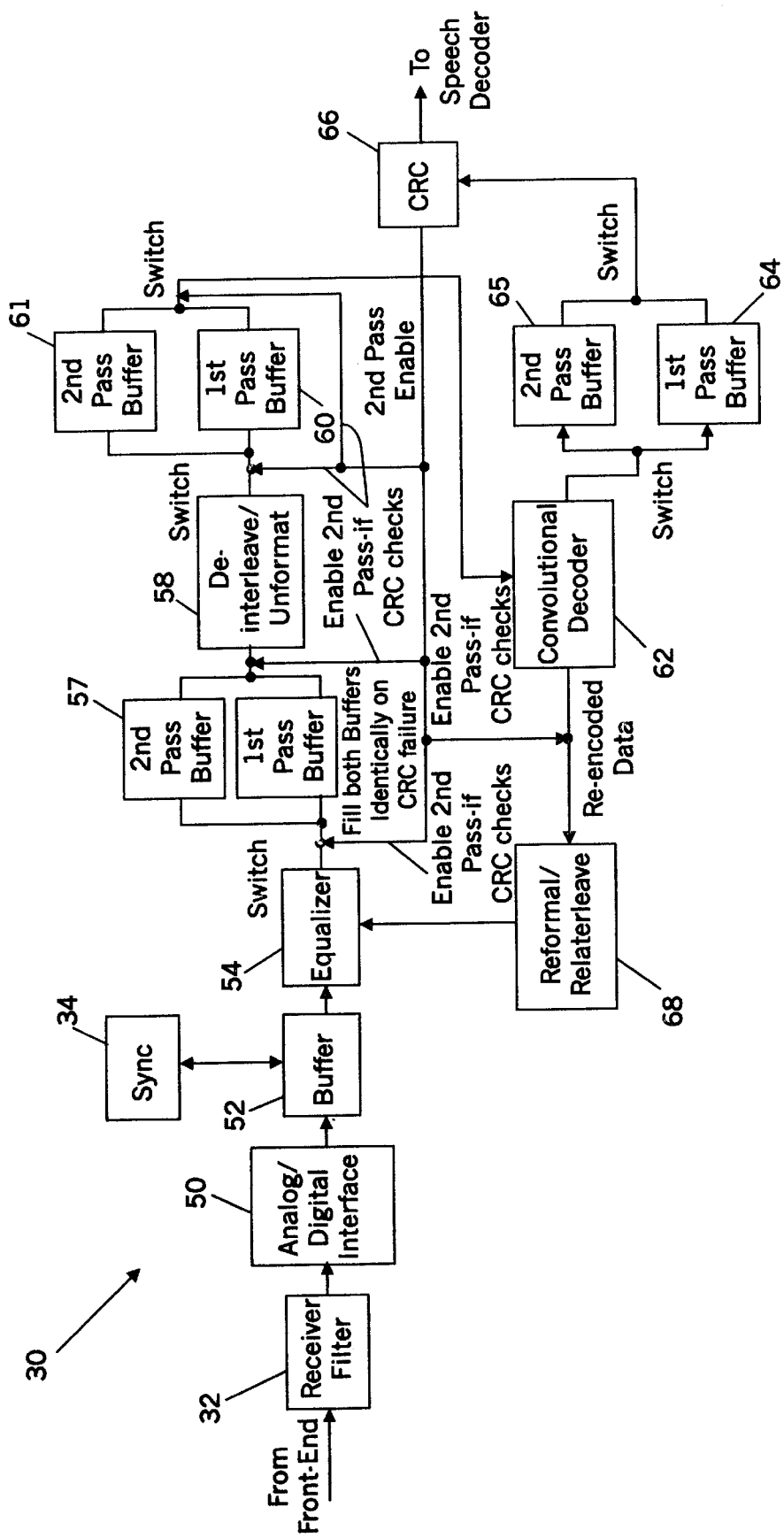
FIG. 3 is a detailed block diagram of a first embodiment of the receiver of FIG. 3.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods or devices. Accordingly, the present invention may take the form of a hardware embodiment, a software embodiment or an embodiment combining software and hardware aspects.

Operations of the present invention will be described primarily herein with reference to mobile terminals which will operate on an ACELP format speech frame (such as that specified in the IS-641 standard and described with reference to FIG. 1B above) and including encoded and unencoded bits. However, the benefits of the present invention may also be realized with mobile terminals which operate in other communication systems using a modulated signal transmitted over a channel subject to noise, fading and other channel effects.

FIG. 2 illustrates an embodiment of a receiver according to the present invention. As illustrated in the embodiment of FIG. 2, the receiver 30 includes a receiver filter 32 which receives and filters the signal from a source such as an antenna, of a device, such as the mobile terminal. The output signal from the receiver filter 32 is provided to a synchronizer circuit 34 which presents successive slots to equalizer (demodulator) 36 for demodulation.

For interleaved communication formats, such as that specified under ACELP, the output slot estimates from equalizer 36 are, in turn, provided to de-interleaver/unformat circuit 38. The encoded bits are passed from the interleaver 38 to a first decoder 40 which may be a convolutional type decoder. The output bit estimates from decoder 40 are, in turn, provided to reformatter/reinterleaver 42 which properly locates the "known" decoded bits output by decoder 40 into the appropriate position to correspond to the received slot from synchronizer circuit 34. The decoder may also produce estimates of the encoded bits which are then fed to the re-interleaver 42. These "known" bits in the appropriate locations are then utilized by a constrained demodulator such as equalizer 44 for a second pass demodulation of the received slot from receiver filter 32.

The output coded bits from second constrained demodulator 44 are de-interleaved and unformatted by circuit 46 and provided to second decoder 48 for decoding. The unencoded bits from second pass demodulator 44 (Class 2 bits) are then combined by a combiner circuit (not shown) with the decoded bit estimates from second decoder 48 to provide a data frame estimate for use by a device, such as a mobile terminal, containing receiver 30.

It is to be understood that, while not shown, the output of decoder 48 and decoder 40 may further be tested for detection of error bits as will be described further herein. It is further to be understood that, while only two passes of demodulation are shown, the benefits of the present invention may also be used with greater than two passes of demodulation, i.e., by recursively using the increasingly reliable known bit estimates from successive decoding passes to further constrain successive demodulation passes in a multi-pass demodulator to provide improved reliability.

For ease of understanding the present invention, two pass demodulation will now be generally described. At the transmitter, the coded and uncoded bits of speech frame n are interleaved over modulator bursts n and n+1. At the receiver, in pass 1, burst n+1 is demodulated, then the coded bits of frame n are decoded, using the pass 1 demodulator outputs for bursts n and N+1 after de-interleaving. For pass 2, the decoder output is re-encoded and re-interleaved to produce the known symbols in burst n+1. Then, burst n+1 is re-demodulated, the pass 1 demodulator output for burst n and the pass 2 demodulator output for burst n+1 are de-interleaved, and so on. Alternatively, in the first pass, the pass 1 demodulator output for burst n+1 and the pass 2 demodulator output for burst n are de-interleaved and so on. In the second pass, the pass 2 demodulator output for burst n+1 and the pass 2 demodulator output for burst n are de-interleaved and so on.

It has been demonstrated by the inventors of the present invention that utilizing a receiver according to the illustrated embodiment of FIG. 2, can provide improvement in error performance for both Class 1 and Class 2 bits. This improvement is in part obtained by passing improved Class 2 bits along with redetected Class 1 bits through the convolutional decoder a second time. In tests of an embodiment of the present invention, improvements from 1 to 2.5 dB have been observed in Class 2 bit error rate under various channel conditions. In addition, an improvement of 0.5 to 1 dB has been demonstrated for Class 1 bit error rates. Corresponding improvements in Class 1 frame error rates have also been demonstrated, corresponding to an improvement in speech quality. Two alternative embodiments of the receiver 30 of FIG. 2 are illustrated in greater detail in FIGS. 3 and 4.

Referring now to FIG. 3, the base band section of the receiver 30 is illustrated. In the embodiment of FIG. 3, the de-interleaver 58 and convolutional decoder 62 treat outputs of first and second pass buffers 56, 57 as independent data streams. In other words, the convolutional decoder operates only on the second pass buffer when the second pass enable signal is active as will be described. However, the equalizer soft output $E_n^1$ (i.e., the first pass slot estimate) is copied into the allocated space for $E_n^2$ (i.e., the second pass slot estimate) if the CRC does not check on the first pass.

Referring now to FIG. 3, the receiver filter 32 receives the signals from a data frame source and provides the signals to an analog to digital interface 50. The output received slot from interface 50 is then stored in a buffer 52 based on the timing synchronization input from synchronization circuit 34. The received slot from buffer 52 is then passed to demodulator (equalizer) 54 for demodulation.

Figure 4:
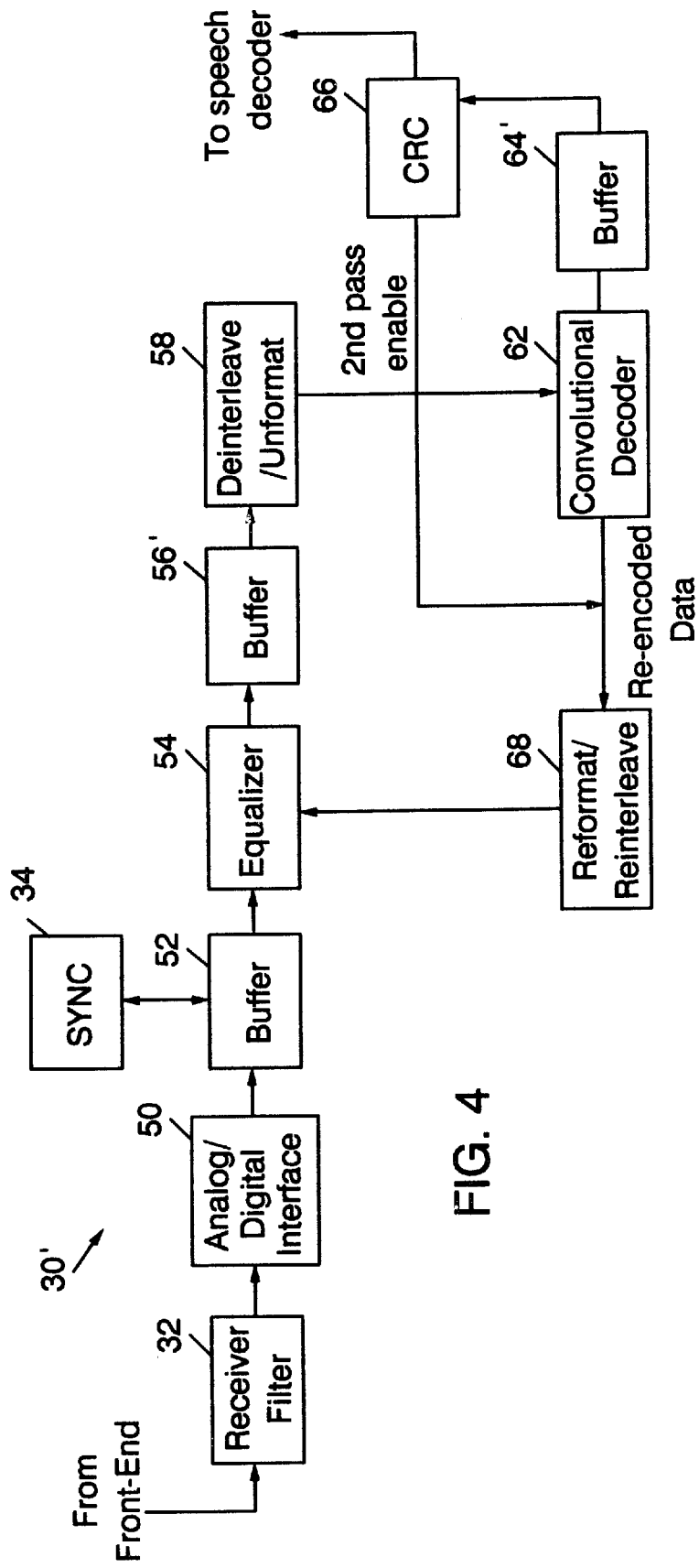
FIG. 4 is a detailed block diagram of a second embodiment of the receiver of FIG. 3.

As will become clear in the embodiments of FIGS. 3 and 4, the receiver architecture provides for the use of a single equalizer and decoder for each of the two passes of the multi-pass demodulation. Each pass of the multi-pass demodulation acts on the same first slot of received information received in buffer 52. Furthermore, while only two passes are illustrated, it can be appreciated by one of skill in the art that additional iterations of multi-pass demodulation may be readily accomplished with the configuration shown for the illustrated embodiments simply by continuing the re-demodulation operations recursively until a decision is made to accept the output and begin processing a subsequently received slot.

For the embodiment of FIG. 3, the output of equalizer 54 from the first pass demodulation is placed into first pass buffer 56. The received first slot estimate from buffer 56 is then provided to de-interleaver/unformatter 58. The de-interleaved information is placed in first pass deinterleaved buffer 60. The de-interleaved first slot estimate from first pass buffer 60 is, in turn, passed to convolutional decoder 62 for decoding to provide first decoded bit estimates which are stored in first pass buffer 64. CRC detector circuit 66 then checks the output of decoder 62 and first pass buffer 64 to determine if any errors have been detected. If no errors are detected, CRC circuit 66 enables a second pass (or next pass in a greater number of iterations embodiment) via an enable signal.

If a second pass is enabled, the output of convolutional decoder 62 is also provided to reformatter/re-interleaver 68 which, in turn, outputs the reformatted information to constrain the appropriate transition stages of equalizer 54 during second pass demodulation. During the second pass, the output of equalizer 54 is placed in second pass buffer 57 which is, in turn, de-interleaved and unformatted by circuit 58 and then placed in second pass buffer 61. The reformatted second slot estimate from second pass buffer 61 is provided to convolutional decoder 62 for decoding of the second slot estimate to provide second decoded bit estimates which are placed in second pass buffer 65. If no error is detected in the second pass buffer output by CRC detector circuit 66, the demodulated and decoded signal is passed on for post-processing, for example by a speech decoder. If an error is detected in the first pass buffer 64 by CRC detect circuit 66, the equalizer soft output $E_n^1$ is copied into the allocated space for $E_n^2$ (i.e., the contents of first pass buffer 56 are moved to second pass buffer 57) to allow continued multi-pass operations without utilizing potentially erroneous bits to constrain demodulation.

FIG. 4 illustrates an alternative embodiment 30' of the receiver 30 of FIG. 2. The embodiment shown in FIG. 4 is, essentially, a simpler realization of the receiver architecture described with reference to FIG. 3 in which the streams $E_n^2$ and $E_n^1$ share the same buffer space. Like reference numbers in FIG. 4 described similar elements to those in FIG. 3 and operate in essentially the same manner. However, there are differences in the buffer requirements in the embodiment of FIG. 4. The second pass outputs of equalizer 54 replace the corresponding first pass outputs in buffer 56' when the second pass demodulation process is enabled. Similarly, the decoded speech frames in successive passes are also copied into the corresponding shared buffer 64'. The embodiment of FIG. 4 is preferred as it is believed that this configuration will maximize the signal to noise ratio (SNR) available at the input to each block resulting in improved performance.

As will be appreciated by those of skill in this art, the above-described aspects of the present invention in FIGS. 2 through 4 may be provided by hardware, software, or a combination of the above. Although various components of receiver 30, 30' have been illustrated as discrete components, they may also, in practice, be implemented in an integrated fashion using a microcontroller including input and output ports and running software code, by custom or hybrid chips, by discrete components or by a combination of the above. For example, all of the components downstream from analog/digital interface 50 may be implemented using a microprocessor or a digital signal processor or other application specific integrated circuit (ASIC). Similarly, various of the operations of receiver 30, 301 illustrated as separate blocks in the figures may be implemented as code executing on a processor.

Exemplary operations according to aspects of the present invention will now be described with respect to the flowchart of FIG. 5. It will be understood that each block of the flowchart illustration, and combinations of blocks in the flowchart illustration, can be implemented by computer program instructions. These program instructions may be provided to a processor to produce a machine, such that the instructions which execute on the processor create means for implementing the functions specified in the flowchart block or blocks. The computer program instructions may be executed by a processor, to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

FIG. 5 illustrates operations for receiving a modulated signal including a plurality of sequentially transmitted slots containing symbols representing encoded bits corresponding to a first subset of bits from a data frame and unencoded bits corresponding to a second subset of bits from the data frame according to an embodiment of the present invention. At block 100, a first slot is received by receiver 30. The received slot is then first pass demodulated, as illustrated at block 102, to provide a first slot estimate having encoded bit positions and unencoded bit positions. For protocols using interleaving where bits from a data frame are contained in both the first slot and a second slot, the slot estimate is de-interleaved as illustrated at block 106 and the encoded bit positions of the first slot estimate are decoded at block 108 to provide first decoded bit estimates.

At block 110, the decoded bit estimates are tested for error, such as by a CRC error detection technique. If an error is found in the bit estimates from block 108, the first slot estimate is reloaded into buffer memory at block 112 to allow multi-pass operations to continue their normal operational flow without actually restricting second pass demodulation based on the error containing decoded results from the first pass. Otherwise, if no error is detected, operations move to block 114 where the first slot is again demodulated to provide a second slot estimate with the demodulation constrained by having encoded bit positions constrained to equal the first decoded bit estimates from block 108. Demodulation may be constrained by combining the first decoded bit estimates along with bits from the unencoded bit positions of the first slot estimate and insertion of unknown bits corresponding to the segment of bits of the data frame which have not been received as a result of the interleaving methodology to provide a regenerated slot. This regenerated slot may be used to restrict trellis transitions during constrained demodulation at block 114.

At block 116, the output of the constrained demodulation at block 114 is de-interleaved. At block 118, the de-interleaved output encoded bits from the constrained demodulation are decoded to provide second decoded bit estimates. If there are no errors in the output from the second pass decoding at block 118, the second decoded bit estimates from block 118 and the unencoded bit positions of the second slot estimate from block 114 are combined to provide a received data frame estimate from receiver 30.

As noted previously, the present invention is not limited to only two pass multi-pass demodulation but may include additional passes for increased reliability. In a first embodiment, the operations of constrained demodulation (block 114) and decoding (block 118) may be repeated using the decoded bit estimates from the most recent previous decoding step in the iteration to constrain the constrained demodulating until, for example, a counter expires. The combination step at block 120 then combines the final set of decoded bit estimates from the last pass before counter expiration to provide the received data frame estimate. Alternatively, operations may be continued recursively until a change in reliability criteria is satisfied. For example, multi-pass operations may continue to iterate until the change in reliability in a subsequent pass falls below a minimum delta level relative to the preceding pass.

Figure 6:
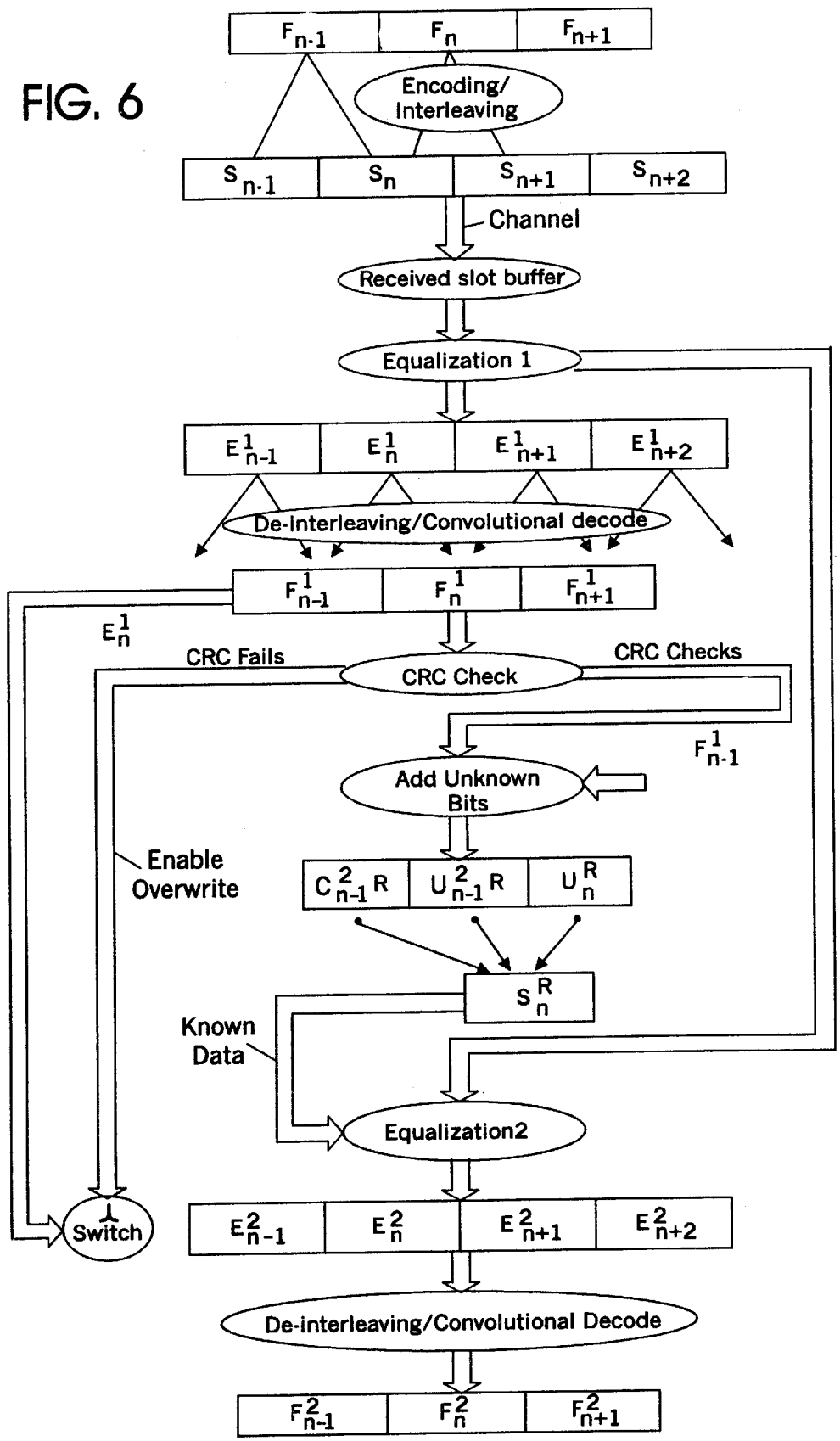
FIG. 6 schematically illustrates process flow for an embodiment of a multi-pass receiver according to the present invention.

FIG. 6 provides a schematic illustration of what happens to speech frames as they are processed according to an embodiment of the present invention is shown. On the transmitting device, speech frames $F_n$ encoded according to a CRC code undergo convolutional encoding and interleaving to form slots $S_n$, so that the current slot $S_n$ is formed from the current speech frame $F_n$, and a previous speech frame $F_{n-1}$. The slots are transmitted over the channel and are received by the receiver 30, 30'.

A received slot $R_n$ is store in a buffer. The slot undergoes synchronization and is passed through the equalizer (demodulator) to form a soft equalizer output $E_n$, before convolutional decoding and de-interleaving produce a reconstructed speech frame $F_{n-1}^R$ corresponding to the previous speech frame $F_{n-1}$. The speech frame $F_{n-1}^R$ is subjected to a CRC detection and is fed to a reformatting procedure if the CRC checks. If the CRC does not check, the speech frame is subject to a bad-frame masking procedure, such as by insertion of comfort noise, repetition of the previous speech frame or prediction of the current speech frame given prior inputs to the speech decoder. 4

The succeeding reconstructed speech frame $F_n^R = U_n$ is assumed to be unknown to ensure no additional delay with respect to the conventional receiver. In addition, the Class 2 bits $C_{n-1}^{2R}$ corresponding to the decoded speech frame $Fn-1^R$ are also assumed to be unknown, and are replaced in the reconstructed speech frame $F_{n-1}^R$ with unknown tags denoted by $U_{n-1}^{2R}$. The detected slot $S_n^R$, is regenerated under that assumption. The regenerated slot $S_n^R$ is used to restrict trellis transitions during a second equalization of the received slot $R_n$, producing a new soft equalizer output $E_n^2$. This soft output slot is passed through the deinterleaver and convolutional decoder a second time as well, to yield the updated speech frame $F_{n-1}^2$ that is passed through a CRC detector. The frame is sent to the speech decoder if the CRC passes.

During the second pass, the equalizer receives a reconstructed slot from the output on the first pass of the convolutional decoder. In FIG. 6, this is shown as the concatenation of the known Class 1 bits $C_{n-1}^{1R}$ and the unknown Class 2 bits $U_{n-1}^{2R}$ corresponding to the speech frame $F_{n-1}$, and the unknown speech frame $U_n$. This concatenation is interleaved to form a tentative slot $S_n^D$ that is used to restrict the trellis transitions of the equalizer in the manner to be shown.

The equalizer trellis for an IS-136 type phone may be formed from a two tap channel. Thus, the state is formed by a single differentially encoded symbol, and the transition from one state to another is determined by an information symbol before encoding. The branch label is given by squared Euclidean distance between the output of the whitened matched filter on that branch corresponding to the received sample, and the response of the whitening filter to the differentially encoded constellation points that caused the branch transition. Such a state transition table is depicted in Table 1.

TABLE 1

State Transition Diagram

| Current State | Channel Symbol | Information Bits (Transition) | | | |
|---|---|---|---|---|---|
| | | 00(1) | 01(j) | 11(−1) | 10(−j) |
| | | | | Next State | |
| 0 | 1 | 0 | 1 | 2 | 3 |
| 1 | j | 1 | 2 | 3 | 0 |
| 2 | −1 | 2 | 3 | 0 | 1 |
| 3 | −j | 3 | 0 | 1 | 2 |

The tentative slot is composed of quaternary symbols, composed of any of the following combinations:
1. Both bits are known; only one trellis transition out of a state is valid;
2. One of the two bits are known; two trellis transitions out of the possible four are valid;
3. Both the bits are unknown; all trellis transitions are valid.

Figure 7:
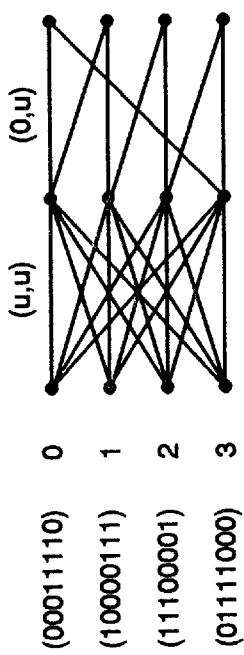
FIG. 7 schematically illustrates pruning of the demodulator trellis according to an embodiment of the present invention.

Referring now to FIG. 7, the pruning technique used to restrict the trellis transitions according to an embodiment of the present invention is schematically illustrated. FIG. 7 shows two stages of the equalizer trellis as seen by the second pass after pruning, the first being one where both bits of the quaternary symbol are unknown after the first-pass demodulation. The unknown bits are labeled above the trellis using the tag u. The second stage corresponds to one known bit 0, and one unknown bit u, denoted using (0, u) above the trellis. The states of the trellis corresponding to the differential constellation points are denoted by the index p={0, 1, 2, 3} within $e^{jp\pi/2}$. The branch labels are specified on the left of the trellis diagram and correspond to trellis branches leading out of a state, starting from the top branch. From examination of the trellis diagram, it is seen that the second stage contains all those paths whose branch labels have the bit 0 in the first position.

The trellis transitions may be pruned either by disallowing an invalid transition, or by adding a large bias to the branch metric computation, so that the children of that transition will be forced out of reckoning during the decision making process.

A pseudo-code representation follows that illustrates that the tentative decisions represented by $S_n^D$ may be used to construct a three dimensional metric bias matrix metricBias, indexed by the current state currentState, the next state nextState, and the symbol symbol:

```
for all stages of the trellis (cnt = 1 through 161) {
        identify bits of the reformatted buffer using
                {int ref0 = reformatbuf [(2*cnt)];
                int ref1 = reformatbuf [(2*cnt + 1)];}
        for all nextState (0 through 3) {
                for all currentState (0 through 3) {
                        determine the branch symbol and convert to bits using
                                {int syb = (nextState - currentState + 4) / % 4;
                                int bit0;
                                int bit1;
                                Diff2Bits (syb, &bit0, &bit1);
                                                // 0 goes to -1 -1,
                                                // and 1 to -1 1
                                                // and 2 to 1 1
                                                // and 3 to 1 -1 }
                        if ref0 is unknown {
                                if ref1 is unknown {// no bias
                                        metricBias [currentState] [nextState][cnt] = 0.0;
                                } else { // ref0 is unknown and ref1 is known
                                                if ref1 equals bit1 { // no bias
                                                        metricBias [currentState][nextState][cnt] = 0.0;
                                                } else { // invalid transition
                                                                // bias the metric
                                                                metricBias [currentState][nextState][cnt] = BIGVALUE;
                                                }
                                }
                        } else { // ref0 is known
                                if ref0 equals bit0 {
                                                if ref1 is unknown {
                                                                // ref0 = bit0 and ref1 is unknown
                                                                // no bias
                                                                metricBias [currentState][nextState][cnt] = 0.0;
                                } else {                // ref0 = bit0 and ref1 is known
                                                if ref1 equals bit1 { // no bias
                                                        metricBias [currentState][nextState][nextState][cnt] = 0.0;
                                                } else { // ref1 does not equal bit1
                                                                // invalid transition
                                                metricBias [currentState][nextState][cnt] = BIGVALUE;
```

-continued

```
                }
            }
        } else { // ref0 does not equal bit0
            metricBias [currentState][nextState][cnt] = BIGVALUE;
        }
      }
    }
  }
}
```

At every computation of the branch metric, the bias defined by the pseudo code is added on to the metric using the following expression.

metric [nextstate][transition]=metric [oldState][survivor]+deltaMetric [nextState][oldState][trellisStage]+metricBias [oldState][newState][trellisStage];

Using the present invention with a protocol such as the IS-136 standard, the Class 2 bit error rate performance may be improved on the basis of tentative decisions on Class 1A and Class 1B bits. Under some channel conditions, this may result in Class 2 error performance that is better than the Class 1B error performance. Accordingly, improved performance may be provided under certain conditions with third and subsequent passes which could use a different set of bits for tentative decisions, namely for the Class 1A and Class 2 bits resulting in improvements to Class 1B error performance. Furthermore, this alteration between decisions on various classes of bits may be carried out over multiple passes resulting in incremental improvements in error performance per pass. Such variations are to be understood to be included within the scope of the present invention.

As described above, forced metric values may be utilized to accommodate the constraining of the second pass to modulation. However, it is to be understood that, alternatively, the same result may be accomplished by discarding during demodulation any candidate bit path having a bit estimate in a location corresponding to one of the encoded bit positions of the slot which differs from the first pass decoded bit estimates corresponding to that location. For hard outputs from the demodulator and decoder on the first pass, this approach may be used as an alternative to biasing the metric of any candidate path having a bit estimate in a location corresponding to one of the encoded bit positions of the first slot which differs from the associated one of the first decoded bit estimates.

The present invention may also be beneficially implemented using a Viterbi algorithm with soft outputs or using other types of algorithms that provide reliability corresponding to the decoded bit estimates. These reliability estimates are preferably used to bias the incremental metrics used by the demodulator in successive passes. The magnitude of bias supplied to the metric may be based on the associated soft reliability value of the associated one of the first decoded bit estimates for each stage of the constrained modulation trellis. For example, the biasing of the metric may be increased proportional to the reliability value of the indicated output. As also described, the multi-pass operations may be iterated until a counter expires or there is no further improvement in reliability.

In a further aspect of the present invention, the first pass demodulation may be performed by a differential decoder rather than an equalizer type demodulator. This provides power saving for receiver operations and may still produce an acceptable result, particularly under conditions where channel dispersion is low. Alternatively, the transition between a differential decoder approach and an equalizer approach may be determined based upon the amount of improvement in a subsequent pass. In other words, where a large improvement is detected in the second pass, it may be desirable to switch to using an equalizer rather than a differential decoder on the first pass, as a large improvement may indicate the channel performance is insufficient to rely on a differential decoder for the first pass of demodulation.

It is to be further understood that a channel-tracker type demodulator is preferably used with the present invention. The feedback for constrained demodulation may be provided by constraining the channel tracking of the demodulator. It is known that there are two alternative demodulator structures for channel trackers referred to generally as a channel model per state or per survivor (CMS) variant and a single channel model (SCM) variant. It has been found that the benefits of the present invention may be best realized using a per survivor (i.e., CMS) structure. However, while this is the preferred approach to implementing the present invention, the benefits of the present invention may be realized with a single channel model type demodulator as well.

The present invention may be used with demodulators based on variants of the Viterbi algorithm. For example, the M-algorithm is a tree search technique that has been used in source encoding, channel decoding, and demodulation. The M-algorithm may be viewed as a reduced complexity approximation to maximum likelihood sequence estimation (MLSE), which is realized using the Viterbi algorithm. The algorithm will be described for an L-ary modulation scheme with $L=2^l$, where l bits map into a modulation symbol s. At the receiver, consider a trellis with $2^{l(D-1)}$ states, capable of handling inter-symbol interference of length D symbols. Each state has a fan-out of $2^l$ branches, each labeled with a different symbol, and a fan-in of $2^l$ branches, all labeled with the same symbol.

In IS-136, for example, l=2, so L=4. The value of D is typically chosen to be 2 for the Viterbi algorithm, in order to keep its complexity manageable. This results in a trellis with 4 states. However, a larger value of 3 or 4 for D may produce better results by taking more of the inter-symbol interference caused by fractional spaced channel dispersion and receiver filtering into account.

The M-algorithm typically operates as follows: For some value M, typically a small fraction of $2^{l(D-1)}$, at stage n−1 of the trellis, there are M surviving states, denoted $\sigma^1_{n-1}, \ldots, \sigma^M_{n-1}$. Their cumulative metrics are denoted by $c^1_{n-1}, \ldots, c^M_{n-1}$. From each of the states, there are $2^l$ outgoing branches. Thus the number V of distinct states reached at stage n is variable, between $2^l$ and $M\,2^l$. Also, each state that is reached has a fan-in f between 1 and $2^l$ branches. There are f candidate path metrics, each equal to the path metric of the beginning state of the branch, plus the branch metric. Finding the smallest candidate metric for the state requires f comparisons. (A trivial comparison between the first candidate metric and a nominal large value may be included to simplify the structure of the algorithm). The path corresponding to the smallest metric is now the surviving path ending in that state. Taking all the states into consideration, the number of comparisons is M $2^l$. Also, for all the states, there are M $2^l$ branch metric computations (each requiring a number of adds and/or multiples), and M $2^l$ adds. Finally, if V>M, then M states $\sigma^1_n, \ldots, \sigma^m_n$, with the smallest cumulative metrics $c^1_{n-1}, \ldots, c^M_{n-1}$ among the V states survive at stage n. (To keep complexity estimates manageable, it is assumed that there are always M surviving states. This leads to an over-estimate of complexity.)

For reference, in a Viterbi algorithm, there are generally $2^l$ branch metric computations per state, for a total of $2^{l(D-1)}$ $2^l$. Each state typically requires $2^l$ additions to produce candidate path metrics, for a total of $2^{l(D-1)}$ $2^l$.

Feedback from the demodulation may be used to modify the M-algorithm according to the present invention. In IS-136, for example, D=3, the full trellis has 16 states. One may choose a value of M as low as 4 with little impact on performance.

In one embodiment, the feedback from the first pass decoder is in the form of hard decisions. That is, the decoder tells the demodulator that specific bits (e.g., 104) are known. The demodulator uses this knowledge to restrict the set of possible sequences it can output. An efficient way to do so is to constrain the trellis by pruning branches that cannot occur, according to the feedback from the demodulator.

The M-algorithm may beneficially implement the constrained trellis according to the present invention. As described above, for an unconstrained stage of the trellis, each state has a fan-out of $2^l$ branches. When i bits out of l are known for that stage, each fan-out is reduced to $2^{l-i}$. Accordingly, there would be M $2^{l-i}$ comparisons, M $2^{l-i}$ branch metric computations and M $2^{l-i}$ adds. These numbers can be boosted back to the earlier ones if there are M $2^i$ surviving states at the beginning of the stage. As the constraining of the trellis stages is known in advance, the number of surviving states for each stage may be specified to implement constrained demodulation according to the methods of the present invention.

The effect of increasing the number of surviving stages by $2^i$ means that the search space is allowed to grow over the sequences deemed acceptable in light of feedback from the decoder. Indeed, the combination of the M-algorithm and decoder feedback may be understood as an M-algorithm applied over acceptable sequences. This applies directly to coded and un-coded modulation schemes. It also may be applied to schemes with cascaded codes, where the inner code would play the role of the demodulator. Also, the coding scheme in the above description may be a convolutional or block code, and may be binary or operate over a larger alphabet. The present invention is compatible with coherent demodulation with tracking, as in the IS-136 standard, or without tracking, as in the GSM standard.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for receiving a modulated signal including a plurality of sequentially transmitted slots containing symbols representing encoded bits corresponding to a first subset of bits from a data frame and unencoded bits corresponding to a second subset of bits from the data frame, the method comprising the steps of:
   receiving a first slot;
   demodulating the first slot to provide a first slot estimate having encoded bit positions and unencoded bit positions;
   decoding the encoded bit positions of the first slot estimate to provide first decoded bit estimates; and then
   constrained demodulating the first slot to provide a second slot estimate having encoded bit positions and unencoded bit positions, wherein the second slot estimate of encoded bit positions is constrained according to the first decoded bit estimates;
   decoding the encoded bit positions of the second slot estimate to provide second decoded bit estimates; and
   combining the second decoded bit estimates and the unencoded bit positions of the second slot estimate to provide a received data frame estimate.

2. A method according to claim 1 wherein the step of decoding the encoded bit positions of the first slot estimate is followed by the step of detecting an error in the first decoded bit estimates and wherein the step of decoding the encoded bit positions of the second slot estimate comprises the step of decoding the encoded bit positions of the first slot estimate to provide second decoded bit estimates if an error is detected in the detecting an error step.

3. A method according to claim 2 wherein the first decoded bit estimates includes at least one error detection bit and wherein the detecting step comprises the step of detecting an error in the first decoded bit estimates based on the at least one error detection bit.

4. A method according to claim 1 wherein the step of constrained demodulating the first slot comprises the step of constrained trellis demodulating the first slot.

5. A method according to claim 4 wherein the step of constrained trellis demodulating the first slot includes the step of discarding during demodulation any candidate bit path having a bit estimate in a location corresponding to one of the encoded bit positions of the first slot which differs from an associated one of the first decoded bit estimates.

6. A method according to claim 4 wherein the step of constrained trellis demodulating the first slot includes the step of biasing a metric of any candidate bit path having a bit estimate in a location corresponding to one of the encoded bit positions of the first slot which differs from an associated one of the first decoded bit estimates.

7. A method according to claim 4 wherein the step of decoding the encoded bit positions of the first slot estimate comprises the step of decoding the encoded bit positions of the first slot estimate to provide first decoded bit estimates each having an associated soft reliability value and wherein the step of constrained trellis demodulating the first slot includes the step of biasing a metric of any candidate bit path having a bit estimate in a location corresponding to one of the encoded bit positions of the first slot which differs from an associated one of the first decoded bit estimates based on the associated soft reliability value of the associated one of the first decoded bit estimates.

8. A method according to claim 4 wherein the step of decoding the encoded bit positions of the second slot estimate is followed by the step of repeating the constrained demodulating and the decoding the encoded bit positions of the second slot estimate steps using the decoded bit estimates from a most recent decoding step to constrain the constrained demodulating until a counter expires and wherein the step of combining comprises the step of combining a final set of decoded bit estimates from the repeating step and the unencoded bit estimates of a final slot estimate from the repeating step to provide the received frame estimate.

9. A method according to claim 4 wherein the step of decoding the encoded bit positions of the second slot estimate is followed by the step of repeating the constrained demodulating and the decoding the encoded bit positions of the second slot estimate steps using the decoded bit estimates from a most recent decoding step to constrain the constrained demodulating until a reliability criteria is satisfied and wherein the step of combining comprises the step of combining a final set of decoded bit estimates from the repeating step and the unencoded bit estimates of a final slot estimate from the repeating step to provide the received frame estimate.

10. A method according to claim 4 wherein the step of demodulating the first slot comprises the step of demodulating the first slot using a differential decoder.

11. A method according to claim 4 wherein the step of demodulating the first slot comprises the step of demodulating the first slot using a differential decoder if a reliability criteria is satisfied and convolutionally demodulating the first slot if the change in reliability criteria is not satisfied.

12. A method according to claim 4 wherein the step of constrained demodulating comprises the step of constrained demodulating using per-survivor processing.

13. A method according to claim 4 wherein the step of demodulating the first slot includes the step of storing the first slot estimate in a first memory location and wherein the step of constrained demodulating includes the step of storing the second slot estimate in the first memory location.

14. A method according to claim 1 wherein a first segment of bits from the data frame is contained in the first slot and a second segment of bits from the data frame is contained in a second slot to provide interleaved data transmission.

15. A method according to claim 14 wherein the first slot is received before the second slot and wherein the step of constrained demodulating is preceded by the step of combining the first decoded bit estimates, bits from the unencoded bit positions of the first slot estimate and unknown bits corresponding to the second segment of bits to provide a regenerated slot and wherein the constrained demodulating step includes the step of constrained trellis demodulating using the regenerated slot to restrict trellis transitions during demodulation.

16. A method according to claim 15 wherein the step of constrained trellis demodulating the first slot includes the step of restricting trellis transitions during demodulation by biasing a metric of selected candidate bit paths based on the regenerated slot.

17. A method according to claim 15 wherein the step of decoding the encoded bit positions of the first slot estimate comprises the step of decoding the encoded bit positions of the first slot estimate to provide first decoded bit estimates each having an associated soft reliability value and wherein the step of constrained trellis demodulating the first slot includes the step of restricting trellis transitions during demodulation by biasing a metric of selected candidate bit paths based on the regenerated slot and on an associated one of the associated soft reliability values.

18. A method according to claim 15 wherein the step of constrained trellis demodulating comprises the step of constrained demodulating using per-survivor processing.

19. A method according to claim 14 wherein the step of receiving comprises the step of receiving the first slot and the second slot and the step of demodulating comprises the step of demodulating the first slot and the second slot to provide a first slot estimate and a third slot estimate each having encoded bit positions and unencoded bit positions corresponding to the data frame and wherein the step of decoding the first slot comprises the steps of deinterleaving the first and third slot estimate and decoding the encoded bit positions corresponding to the data frame to provide first decoded bit estimates.

20. A method according to claim 19 wherein the step of receiving comprises the step of receiving the second slot and then receiving the first slot.

21. A method according to claim 4 wherein the step of constrained trellis demodulating the first slot comprises the step of constrained trellis demodulating the first slot using an M-algorithm having a plurality of trellis stages.

22. A method according to claim 21 wherein the step of constrained trellis demodulating includes the step of specifying a number of surviving states for at least one of the plurality of trellis stages.

23. A method according to claim 22 wherein the step of specifying a number of surviving states comprises the step of specifying the number of surviving states for the plurality of trellis stages so as to allow only acceptable paths to continue as surviving states.

24. A method for receiving a modulated signal including a plurality of sequentially transmitted slots, the method comprising the steps of:

receiving a first slot;

demodulating the first slot to provide a first slot estimate;

decoding the first slot estimate to provide first decoded bit estimates; and then constrained demodulating the first slot to provide a second slot estimate wherein a plurality of bit positions in the second slot estimate are constrained to equal associated ones of the first decoded bit estimates;

decoding the second slot estimate to provide a received data frame estimate; and recursively repeating the constrained demodulating step and the decoding the second slot estimate step wherein the data frame estimate is used to constrain the constrained demodulation step.

25. A method according to claim 24 wherein the step of recursively repeating comprises the step of recursively repeating the constrained demodulating and decoding the second slot estimate steps until a counter expires.

26. A method according to claim 24 wherein the step of recursively repeating comprises the step of recursively repeating the constrained demodulating and decoding the second slot estimate steps until a reliability criteria is satisfied.

27. A receiver system for receiving a modulated signal including a plurality of sequentially transmitted slots containing symbols representing encoded bits corresponding to a first subset of bits from a data frame and unencoded bits corresponding to a second subset of bits from the data frame, the receiver comprising:

a receiver configured to receive the transmitted slots;

a first demodulator coupled to the receiver and configured to generate a first slot estimate from a received slot;

a first decoder coupled to the demodulator so at to provide first decoded bit estimates from the first slot estimate and a constraint slot;

a constrained demodulator configured to generate a second slot estimate based on the constraint slot;

a second decoder coupled to the constrained demodulator so as to provide second decoded bit estimates from the second slot estimate; and means for combining the second decoded bit estimates and unencoded bit positions of the second slot estimate to provide a received data frame estimate.

28. A receiver system according to claim 27 wherein the demodulator is a differential decoder and the constrained demodulator is a trellis demodulator.

29. A receiver system according to claim 27 further comprising buffer memory configured to store the first slot estimate and the second slot estimate.

30. A receiver system according to claim 29 wherein the buffer memory is configured to store the first slot estimate and the second slot estimate in the same memory location.

* * * * *